(12) United States Patent
Morizono

(10) Patent No.: US 6,337,474 B1
(45) Date of Patent: *Jan. 8, 2002

(54) SCANNING MICROSCOPE

(75) Inventor: Kotaro Morizono, Osaka (JP)

(73) Assignee: Kenyence Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/340,158

(22) Filed: Jun. 28, 1999

(51) Int. Cl.[7] .................. G02B 21/00; G02B 21/18; G02B 21/36
(52) U.S. Cl. ................. 250/208.1; 250/226; 250/235; 359/385
(58) Field of Search .................. 250/234, 235, 250/236, 216, 226, 208.1, 559.05, 559.06, 559.07, 559.08, 559.22, 559.24; 359/318, 368, 385, 393; 356/376, 380, 386, 387; 382/321, 222, 223; 348/79, 80, 268, 269, 272

(56) References Cited

U.S. PATENT DOCUMENTS 3,913,128 A * 10/1975 Van den Bosch ........... 348/269
4,011,748 A * 3/1977 Bond et al. ................. 73/601
5,343,038 A * 8/1994 Nishiwaki et al. .......... 250/234
5,430,807 A * 7/1995 Gravely ...................... 382/128
5,805,342 A * 9/1998 Gravely ...................... 359/618

FOREIGN PATENT DOCUMENTS

JP     57-20594    12/1982
JP     11-14907   * 1/1999

* cited by examiner

Primary Examiner—John R. Lee
(74) Attorney, Agent, or Firm—Sughrue Mion, PLLC

(57) ABSTRACT

A color optical microscope having first optics that converges laser light on a sample by means of an objective lens and relatively scans the laser light across the surface of sample. The reflection of the laser light is received by a light-receiving element and a second optics that irradiates the sample with white light so that its reflection is received by a color two-dimensional imaging device. Color picture signals are produced by combining the luminance information from the first light-receiving element in the first optics with the color information from the color two-dimensional imaging device in the second optics.

24 Claims, 8 Drawing Sheets

SCANNING MICROSCOPE

BACKGROUND OF THE INVENTION

1. Technical Field of the Invention

The present invention relates to a scanning microscope that relies upon the theory of confocal technology.

2. Description of the Related Art

Scanning microscopes operating on the theory of confocal technology have been available. A scanning microscope has both an objective lens and a pinhole. When a sample is at the focal position of the objective lens, laser light passing through the pinhole is received by a first light-receiving element and only the image (confocal image) of an area at the height to be viewed is clearly visible (has high resolution). The thus produced confocal image is black-and-white (achromatic). The black-and-white image contains only limited information (is devoid of information on the color of the sample) and often involves difficulty in obtaining the sample's details, such as the identity of surface flaws and deposits. To deal with this difficulty, color (achromatic) scanning microscopes have been proposed and used in the art.

A related color scanning microscope is designed to scan the surface of a sample with laser light of three primary colors from three light sources, thereby increasing the complexity of the optics in the microscope, making it costly and bulky.

SUMMARY OF THE INVENTION

An object, therefore, of the present invention is to provide a color scanning microscope of smaller size and lower cost.

To attain the stated object, the present invention produces color picture signals on the basis of both the luminance information from a first light-receiving element in first optics using laser light and the color information from a second light-receiving element in second optics using color information providing illumination light.

In the present invention, the luminance information from the first optics using laser light helps provide higher resolution than a simple magnified image using white light. Additionally, the color information from the second light-receiving element provides a color picture that enables the viewing of a sample's details, such as surface flaws and deposits.

If the laser light converging in the present invention forms a tiny spot, it is scanned relatively across the surface of the sample in a two-dimensional manner. If the converging laser light is linear (a line of laser light), it is scanned relatively across the surface of the sample in a generally perpendicular direction. The expression "scanned relatively across the surface of the sample" shall cover at least the following three cases: the sample is at rest while the laser light or the line of laser light is scanning; the sample is moved rather than the laser light or the line of laser light during scanning; and the laser light is scanned in the X-direction while the sample is moved in the Y-direction (perpendicular to the X-direction).

In the present invention, "color picture signals" are those signals which, either on their own or after being processed appropriately, can produce color pictures. They include picture signals indicating the intensities of three primary colors of light (red, green and blue), signals comprising both luminance and color difference signals, and composite color picture signals containing horizontal sync signals and color burst signals. The term "luminance information" means information about luminance that does not contain colors, and the term "color information" means information, as in color difference signals, that indicates the balance between color intensities.

The expression "on the basis of the luminance information from the first light-receiving element and the color information from the second light-receiving element" means that color picture signals are produced in one of the following cases.

In the first case, color picture signals contain both the luminance information from the first light-receiving element and the color information in the color imaging information from the second light-receiving element. The term "color imaging information" means the information obtained by imaging which contains both the "luminance information" and "color information".

In the second case, color picture signals contain both the corrected luminance signal based on the luminance information from the first light-receiving element and the color information in the color imaging information from the second light-receiving element.

In the third case, color picture signals contain both the luminance information from the first light-receiving element and the corrected color information based on the color information in the color imaging information from the second light-receiving element.

In the fourth case, color picture signals contain both the corrected luminance information and corrected color information.

The entire disclosure of each and every foreign patent application from which the benefit of foreign priority has been claimed in the present application is incorporated herein by reference, as if fully set forth.

BRIEF DESCRIPTION OF THE DRAWINGS

FIG. 5(a) is a block diagram of the second embodiment of the invention.

FIG. 8 (b) is a diagram showing the way of scanning a line of laser light in the fourth embodiment of the invention.

DETAILED DESCRIPTION OF THE INVENTION

Several embodiments of the invention are hereunder described with reference to the accompanying drawings.

Figure 1:
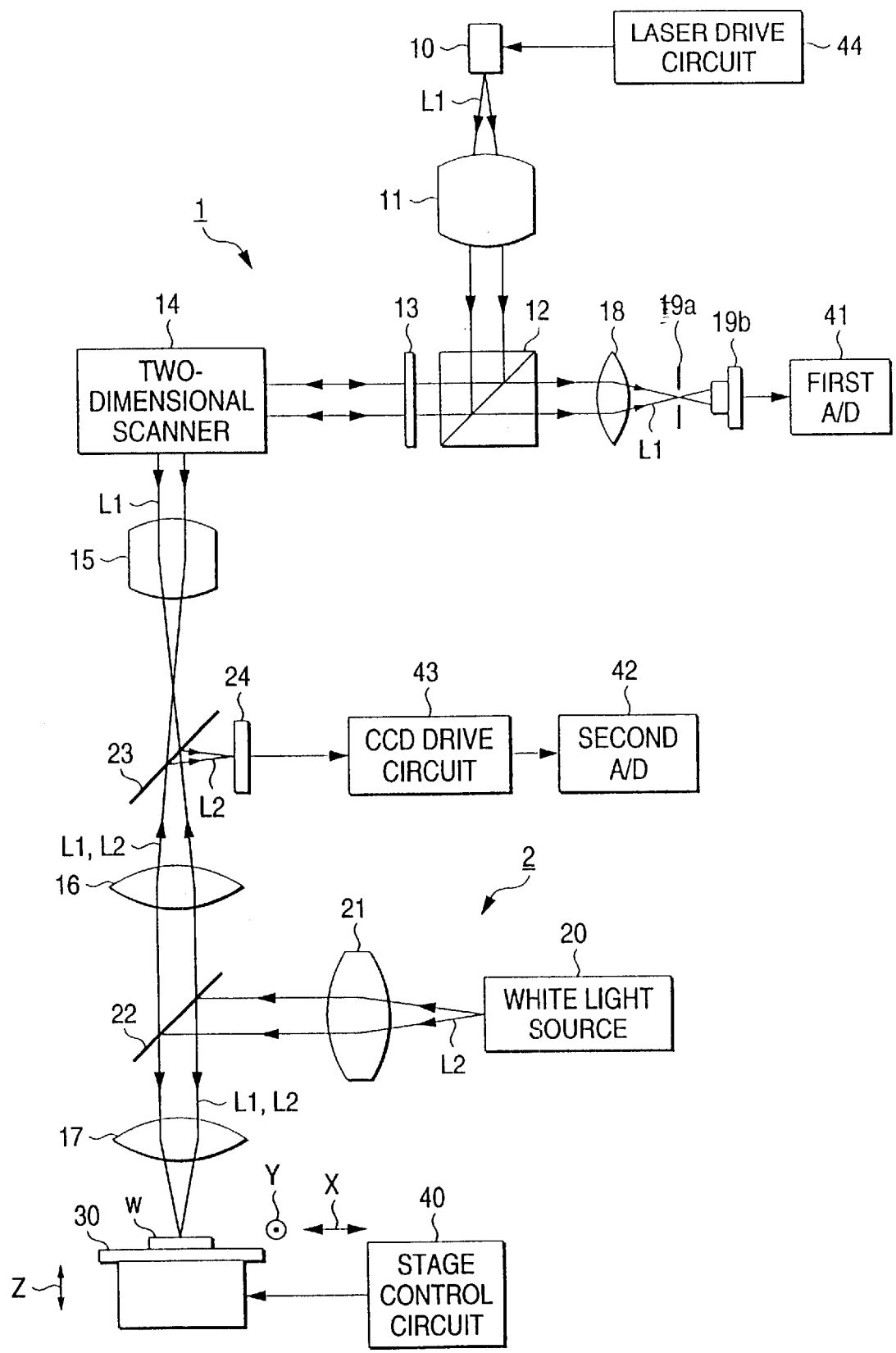
FIG. 1 is a schematic diagram showing the general layout of a scanning microscope according to the first embodiment of the invention.
Figure 2:
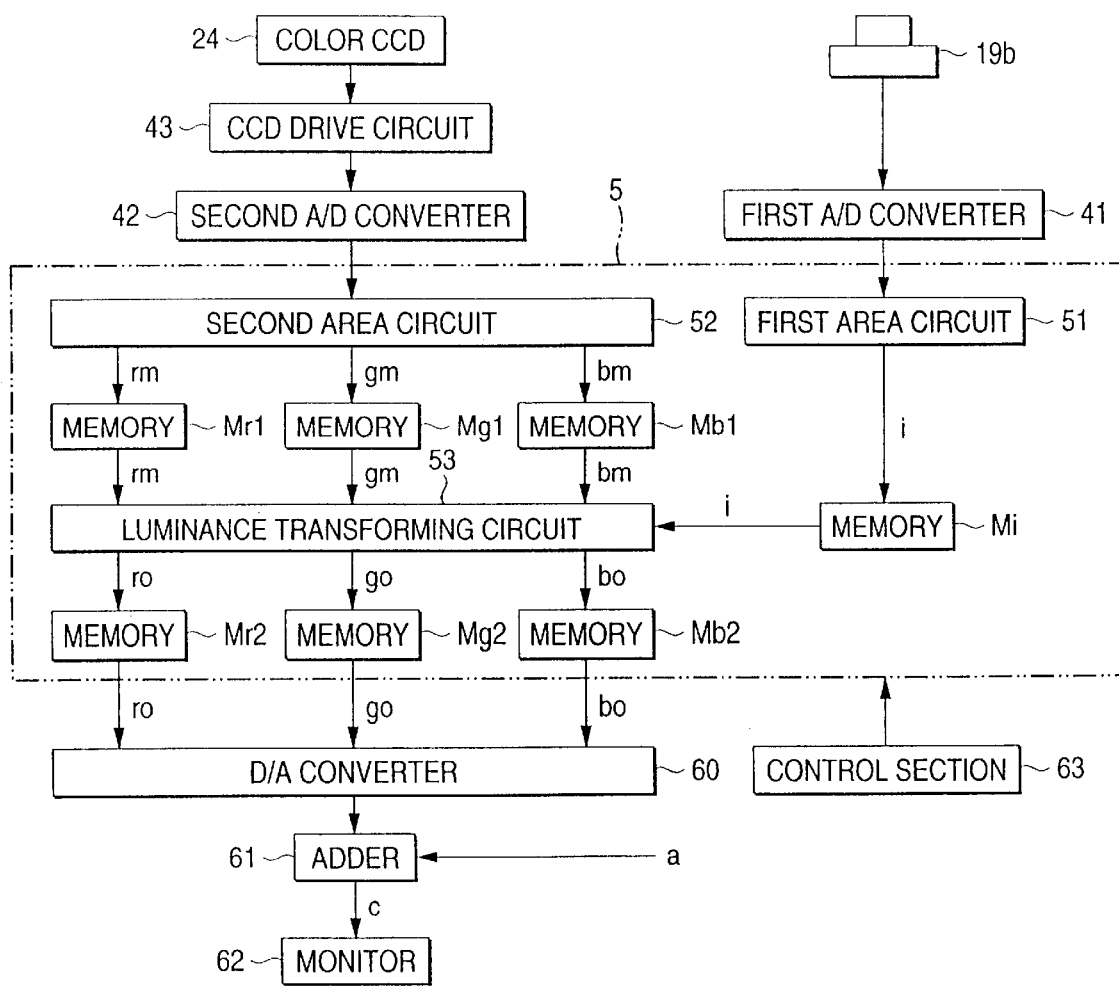
FIG. 2 is a block diagram of the same scanning microscope.

A first embodiment of the invention will now be described with reference to FIGS. 1–4. As shown in FIG. 1, the scanning microscope of the invention has both laser optics (the first optics) 1 and white light optics (the second optics) 2.

We first describe the laser optics 1. This is confocal optics capable of detecting information about the depth of a sample w, and its typical light source is a He—Ne laser 10 emitting red laser light L1. On the optical axis of the laser 10, a first collimator lens 11, a polarizing beam splitter 12, a one-quarter wavelength plate 13, a two-dimensional scanner 14, a first relay lens 15, a second relay lens 16 and an objective lens 17 are provided in that order. A sample stage 30 is provided near the focal position of the objective lens 17 so that it converges the laser light L1 on the surface of the sample w. The two-dimensional scanner 14 is typically composed of two galvanomirrors, and it deflects the laser light L1 so that the position of its convergence on the sample w is scanned two-dimensionally (in the X- and Y-directions) across the surface of the sample w.

The sample stage 30 is controlled with a stage control circuit 40 to be driven in the Z-direction (either up or down) whereas it can be moved with a manual handle in the X- and Y-directions.

The response light, or the laser light L1 reflected from the sample w, goes back along a return path consisting of the objective lens 17, second relay lens 16, first relay lens 15, two-dimensional scanner 14, one-quarter wavelength plate 13 and polarizing beam splitter 12 to be directed toward a second imaging lens 18. The laser light LI is converged by the second imaging lens 18 and passes through a light stop 19a having a pinhole to be incident upon a first light-receiving element 19b. Being typically composed of a photomultiplier or a photodiode, the first light-receiving element 19b performs photoelectric conversion on the incident laser light L1, and the resulting analog signal indicative of the quantity of the light is output to a first A/D converter 41 via an output amplifier and a gain control circuit (not shown).

We next describe the luminance information obtained with the laser optics 1. The light stop 19a is provided at the focal position of the second imaging lens 18 and its pinhole is extremely small in diameter. If the laser light L1 focuses on the sample w, its reflected component LI forms a focused image at the pinhole in the light stop 19a and a significantly increased quantity of the incident light is received by the first light-receiving element 19b. Conversely, if the laser light L1 does not focus on the sample w, its reflected component L1 hardly passes through the pinhole in the light stop 19a and a significantly reduced quantity of the light is received by the first light-receiving element 19b. Therefore, among the various areas being imaged (or scanned) with the laser optics 1, a bright picture is obtained in areas in focus (imaging units in focus) whereas a dark picture results in areas of other heights. Since the laser optics 1 is of a confocal type using monochromatic laser light L1, the luminance information it produces has high resolution.

We next describe the white light optics 2. Its light source is a white light source 20 emitting white light (color information providing illumination light) L2. On the optical axis of the white light source 20, a second collimator lens 21, a first half mirror 22 and the already mentioned objective lens 17 are provided. The white light optics 2 is provided in such a way that its optical axis agrees with the optical axis of the laser optics 1 in the first half mirror 22. Hence, the white light L2 is convergent at the same point as the area being scanned with the laser light L1. The white light (response light) L2 reflected from the sample w passes through the objective lens 17, first half mirror 22 and second relay lens 16 and is reflected by a second half mirror 23 to form a focused image on the surface of a color CCD (second light-receiving element) 24. In other words, the color CCD 24 is provided in a position conjugate or nearly conjugate with the light stop 19a. It should be noted that the image captured with the color CCD 24 is read into a CCD drive circuit 43 as analog color imaging information and output to a second A/D converter 42.

As will be described later in this specification, a color picture signal generating section operates in a color confocal image mode. On the pages that follow, this section is described with reference to FIG. 2 in which it is indicated by reference numeral 5.

The color picture signal generating section 5 combines the luminance information from the first light-receiving element 19b with the color information from the color CCD 24 to generate color picture digital signals ro, go and bo. The color picture signal generating section 5 basically includes a first and a second area circuit 51 and 52, as well as a luminance transforming circuit 53.

Figure 3:
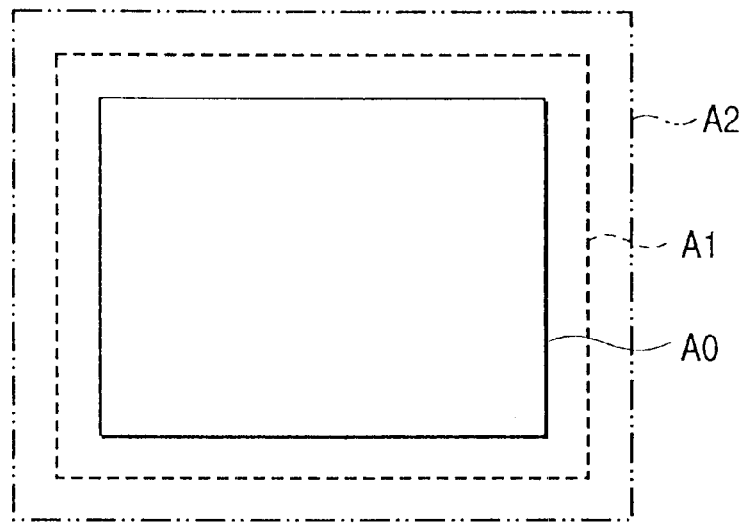
FIG. 3 is a plan view of the area to be imaged.

As shown in FIG. 3, each of the first and second area circuits 51 and 52 selects a picture area A0, which is a specified area common to areas A1 and A2 that are being imaged with the laser optics 1 and the white light optics 2, respectively, and outputs digital signals for the selected area. As for the picture area A0, the first area circuit 51 shown in FIG. 2 causes a luminance memory Mi to store a luminance signal i at resolutions that are suitable for the individual pixels in the color CCD 24. Also with regard to the picture area A0, the second area circuit 52 causes first color intensity memories Mr1, Mg1 and Mb1 to store red, green and blue intensity signals rm, gm and bm for each pixel. Color intensity signals are signals that indicate the luminances (intensities) of the three primary light colors.

In accordance with the following operating equations (1), (2) and (3), the luminance transforming circuit 53 replaces the luminance information in the aforementioned color intensity signals rm, gm and bm for each pixel by the luminance information in the luminance signal i in order to determine transformed color intensity signals ro, go and bo. The circuit 53 then stores these signals in second color intensity memories Mr2, Mg2 and Mb2. The operating equations are as follows:

$$Ro = I \cdot Rm/(Rm+Gm+Bm) \qquad (1)$$

$$Go = I \cdot Gm/(Rm+Gm+Bm) \qquad (2)$$

$$Bo = I \cdot Bm/(Rm+Gm+Bm) \qquad (3)$$

wherein I is the luminance of the luminance signal I, Rm, Gm, and Bm are the luminances (intensities) of color intensity signals rm, gm and bm, and Ro, Go, and Bo are the luminances (intensities) of transformed color intensity signals ro, go and bo.

Note that the first color intensity memories Mr1, Mg1 and Mb1 and the second color intensity memories Mr2, Mg2 and Mb2 each have a memory section of a capacity that is comparable to a portion of the pixels in the color CCD 24 that correspond to those in the aforementioned picture area A0.

The thus obtained transformed color intensity signals ro, go and bo are those signals which substitute the luminance information from the first light-receiving element 19b for the luminance information in the color imaging information from the color CCD 24. The transformed color intensity signals ro, go and bo are read out of the second color intensity memories Mr2, Mg2 and Mb2 and output to a D/A converter 60. From the D/A converter 60, the signals are fed into an adder 61 and added with a sync signal a to produce an analog composite color picture signal c. The composite color picture signal c is output to a monitor 62 which displays a picture of the sample w.

This is how the scanning microscope according to the first embodiment of the invention is used.

The scanning microscope is used in one of the following three modes: an area search mode; a black-and-white (achromatic) confocal image mode; and a color confocal image mode. Selection among these modes is entered from a control section 63.

When an area search mode is selected, the color picture signal generating section 5 stops a laser drive circuit, which is indicated by reference numeral 44 in FIG. 1. At the same time, it activates the CCD drive circuit 43 to have the color CCD 24 perform imaging. In the area search mode, the color intensity signals rm, gm and bm stored in the first color intensity memories Mr1, Mg1 and Mb1 are output as such from the second area circuit 52 (see FIG. 2) and supplied to the D/A converter 60 so that an ordinary magnified image having a great depth of field is displayed on the monitor 62. The area the operator wants to image can be located by moving the sample stage 30 (see FIG. 1) in the X- and Y-directions.

When a black-and-white confocal image mode is selected, the color picture signal generating section 5 (see FIG. 2) activates the laser drive circuit 44, two-dimensional scanner 14 and other pertinent components of the laser optics 1 so that imaging is done with the laser optics 1. In the black-and-white confocal image mode, the luminance signal i stored in the luminance memory Mi is output as such from the first area circuit 51 (see FIG. 2) and supplied to the D/A converter 60 so that a black-and-white (achromatic) magnified view of high resolution is displayed on the monitor 62.

When a color confocal image mode is selected, the laser drive circuit 44 and the CCD drive circuit 43 are driven alternately as described below.

Figure 4:
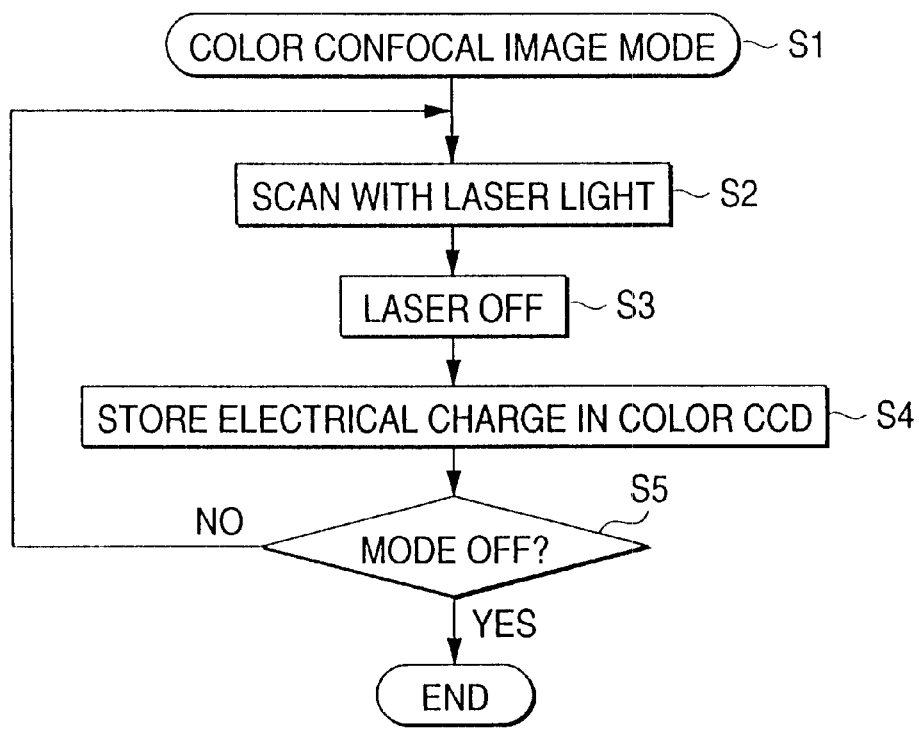
FIG. 4 is a flowchart of the operation of the scanning microscope.

Reference should now be made to the flowchart in FIG. 4. When the color confocal image mode is selected in step S1, the process proceeds to step S2 and a one-screen scan is performed with the laser light L1. The process then proceeds to step S3, in which the laser drive circuit 44 (see FIG. 1) stops and the laser 10 no longer emits laser light L1. Given this state, the process proceeds to step S4 and the color CCD 24 stores electrical charge. The color intensity signals rm, gm and bm (see FIG. 2) that have been obtained in step S4 have the luminance information contents replaced by the luminance information in the luminance signal i obtained in step S2, thus producing transformed color intensity signals ro, go and bo. The transformed color intensity signals ro, go and bo are respectively stored in the second color intensity memories Mr2, Mg2 and Mb2, from which they are output to the D/A converter 60 to have a magnified color image displayed on the monitor 62.

Following step S4, the process proceeds to step S5 the laser light L1 is scanned, and the charge storage and signal reading activating steps by the CCD drive circuit 43 and signal are repeated.

The thus obtained color confocal image has low resolution in color information, so compared with the related color laser microscope using laser light of three primary colors, the image resolution that can be attained is somewhat low. However, the image has a sufficiently higher resolution than ordinary magnified images that it is of satisfactorily high value in practical use.

What is more, color information is produced with the white light optics 2 using the white light source 20 and the color CCD 24 (see FIG. 1), so compared with the related color laser microscope using laser light of three primary colors, the optics has a very simple structure, contributing to a reduction in cost and size of the scanning microscope.

It should also be noted that in this embodiment, when imaging is done by means of the color CCD 24 shown in FIG. 1 (i.e., electrical charge is stored in the color CCD 24), the laser drive circuit 44 is stopped to ensure that no part of the laser light L1 will be incident upon the color CCD 24. As the result, the image produced is not tinged with the color of the laser light L1, but instead presents colors very similar to the actual colors of the sample w.

Various methods may be employed to ensure that no part of the laser light L1 will be incident upon the color CCD 24. Also, that a shutter that blocks the laser light L1 or sets the laser light LI to scan outside the area to be imaged with the color CCD 24, is used. It should, however, be noted that even if the laser light L1 is incident upon the color CCD 24 to produce a picture tinged with the color of the laser light L1, the picture is a color picture after all and, hence, included within the scope of the present invention.

Further referring to FIG. 1, if the color of the sample w has the same hue as the color of the laser light L1, the quantity of the reflected light LI from the sample w [as represented by the luminance I in equations (1) to (3)] will increase. Therefore, more light will be incident upon the first light-receiving element 19$b$. As a result, the picture obtained is more whitish than the actual color of the sample w. To cope with this situation, the second embodiment shown in FIG. 5($a$) is adapted to be capable of producing a picture having a color similar to that of the actual color of the sample even if it has the same hue as the laser light L1.

Figure 5:
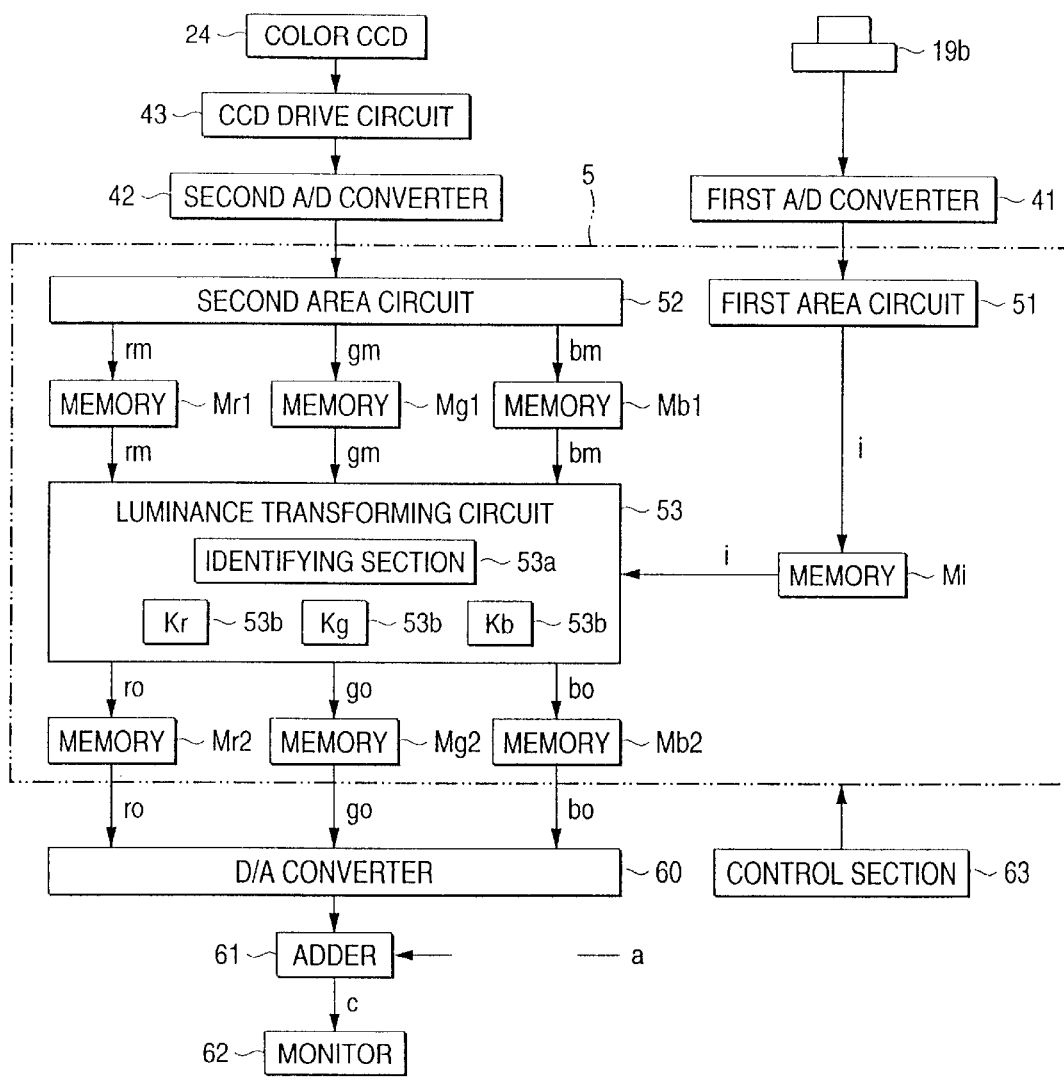
FIG. 5 (b) is a set of graphs showing correction variables.
Figure 5:
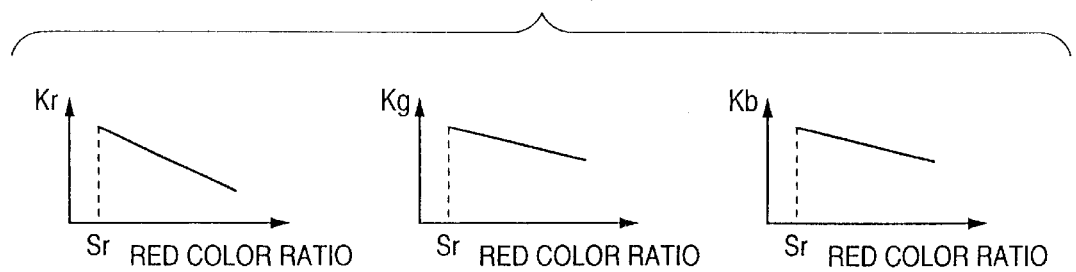

The second embodiment shown in FIG. 5($a$) differs from the above-described first embodiment in that the luminance transforming circuit 53 has an identifying section 53$a$ and three correction variable storage sections 53$b$ that store correction variables.

In the second embodiment, the luminance transforming circuit 53 corrects the luminances Rm, Gm and Bm of the color intensity signals rm, gm and bm in accordance with the following operating equations (11) to (13) to determine the luminances (intensities) Ro, Go and Bo of the transformed color intensity signals ro, go and bo:

$$Ro = Kr \cdot I \cdot Rm/(Rm+Gm+Bm) \quad (11)$$

$$Go = Kg \cdot I \cdot Gm/(Rm+Gm+Bm) \quad (12)$$

$$Bo = Kb \cdot I \cdot Bm/(Rm+Gm+Bm) \quad (13)$$

wherein Kr, Kg, and Kb are correction variables.

The identifying section 53a in the luminance transforming circuit 55 compares the red color ratio Rc [see equation (14) below] with a specified threshold Sr and checks, for each of the imaging units (the pixels in the color CCD 24) in the area of the sample w being imaged, to see if the portion of each imaging unit is more reddish than the specified threshold Sr.

$$Rc = Rm/(Rm+Gm+Bm) \quad (14)$$

Thus, the identifying section 53$a$ is such that if the luminance of the red color, Rm, as received by each of the pixels in the color CCD 24 is greater than the sum of the luminances of the three primary colors (Rm+Gm+Bm), it concludes that the portion of a particular imaging unit of interest is reddish.

If the red color ratio Rc defined by the equation (14) is smaller than the threshold Sr, the luminance transforming circuit 53 is set for Kr=Kg=Kb=1, thereby producing transformed color intensity signals ro, go and bo as in the already discussed first embodiment. On the other hand, if Rc is equal to or greater than Sr, the luminance transforming circuit 53 reads correction variables Kr, Kg and Kb out of the correction variable storage section 53b and produces transformed color intensity signals ro, go and bo in accordance with the aforementioned equations (11) to (13).

FIG. 5(b) shows graphs illustrating how the correction variables Kr, Kg and Kb change. In a typical case, each of the correction variables Kr, Kg and Kb is set to become progressively smaller than unity (1.0) as the red color ratio Rc of an individual imaging unit for the sample w increases. Therefore, multiplication by the correction variable Kr, Kg or Kb as in the foregoing equations (11) to (13) produces a smaller value of luminance. As a result, given a large value of red color ratio Rc, the resulting picture is by no means whitish but presents a color very close to the actual color of the sample w.

If a sample w having surface asperities is examined in the above-described color confocal image mode, areas not in focus (not located at the same height) will produce a dark picture. To deal with this situation, the third embodiment of the invention, shown in FIGS. 6 and 7, is adapted to have an asperity-compatible color confocal image mode that is suitable for examination of the sample w having surface asperities.

Described below is the construction of the third embodiment of the invention, which is adapted to have the asperity-compatible color confocal image mode.

Figure 6:
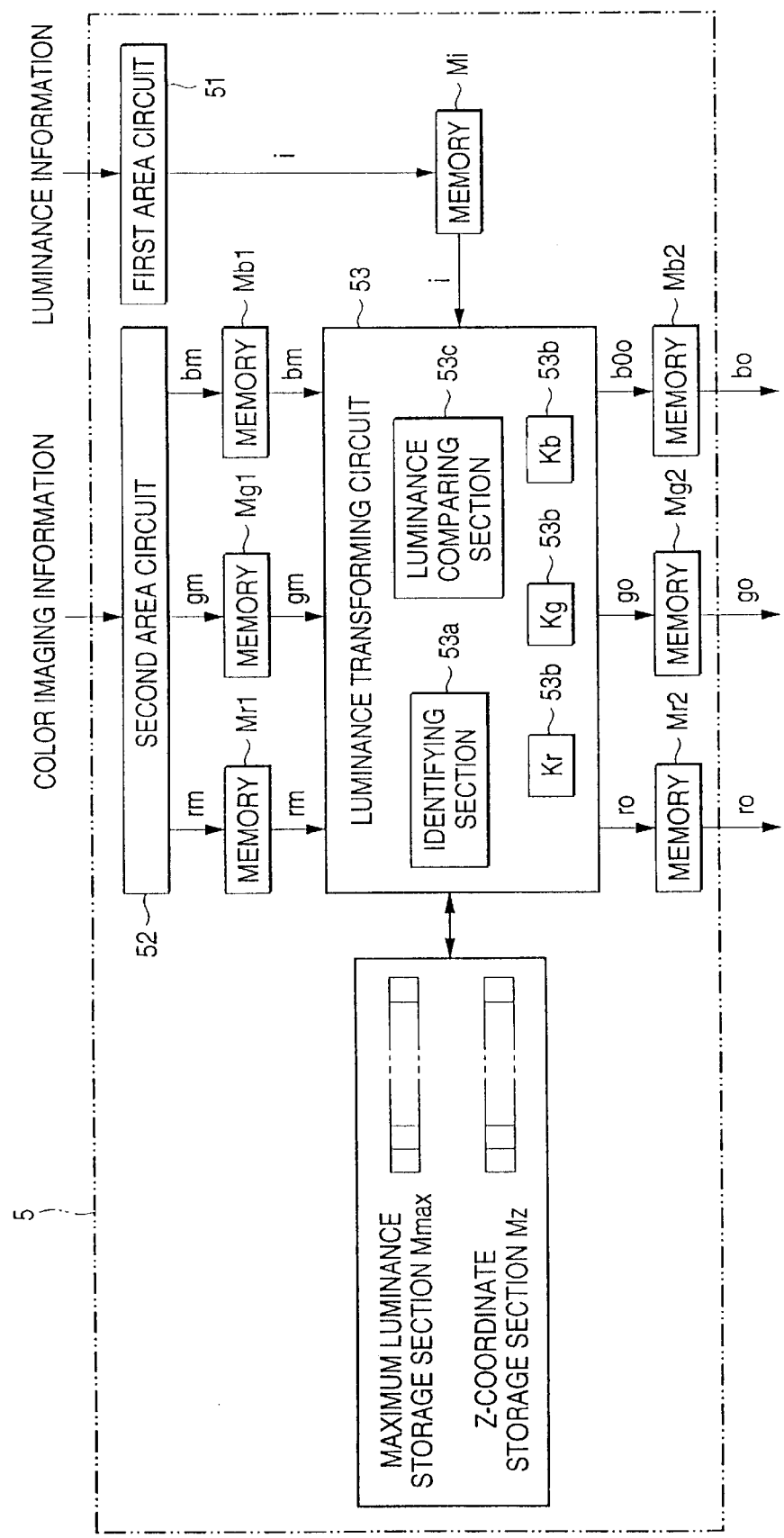
FIG. 6 is a block diagram of a color picture signal generating section of the third embodiment of the invention.
Figure 7:
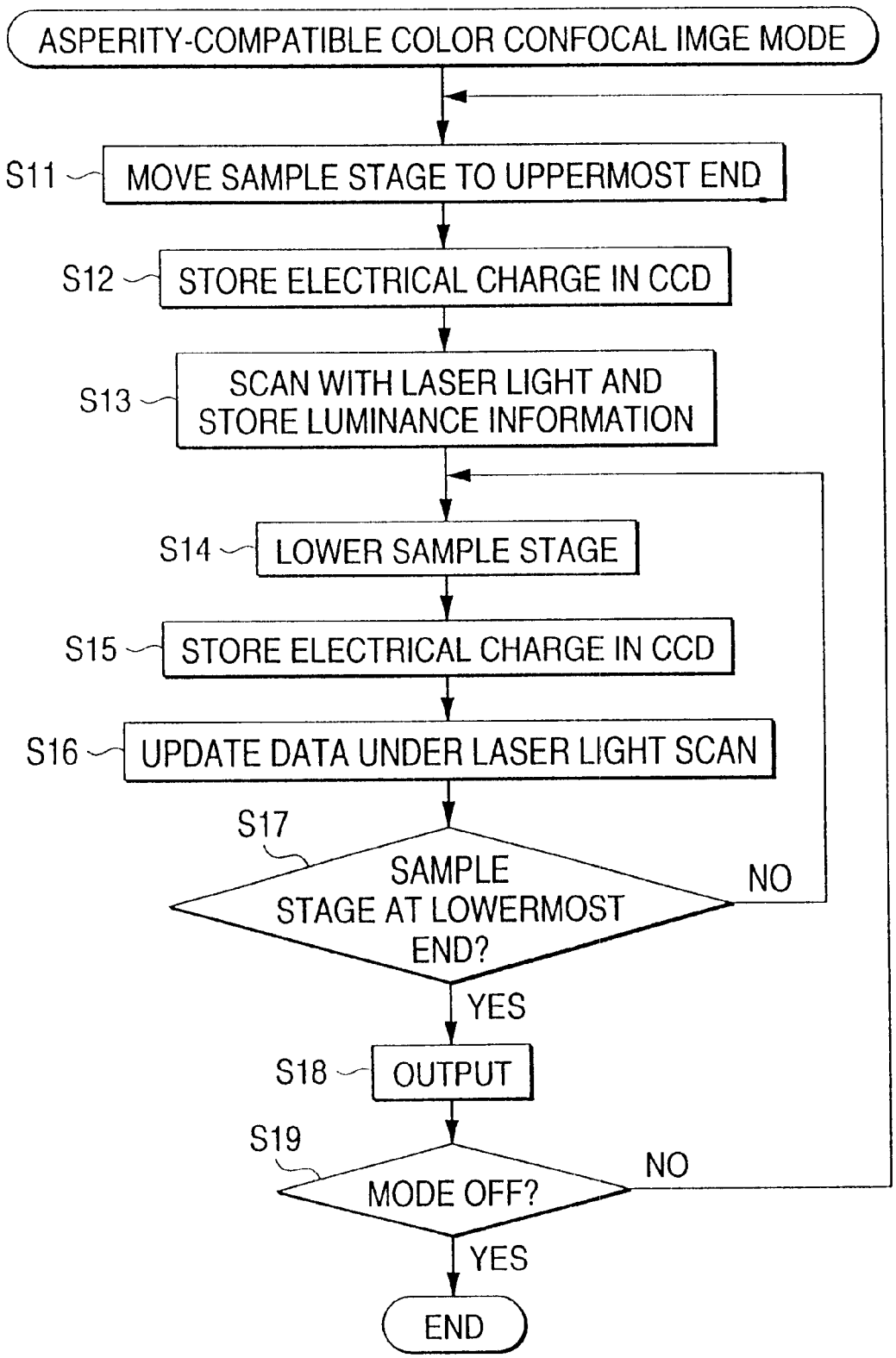
FIG. 7 is a flowchart of the third embodiment of the invention.

As shown in FIG. 6, the third embodiment is characterized in that the color picture signal generating section 5 has a memory consisting of a maximum luminance storage section Mmax and a Z-coordinate storage section Mz. The maximum luminance storage section Mmax stores, for each of the imaging pixels in the scan range (units corresponding to the individual pixels in the color CCD 24), the maximum luminance Imax of the light received by the first light-receiving element 19b (see FIG. 5(a)). The Z-coordinate storage section Mz stores, for each imaging unit, the Z-coordinate (the height of the sample stage 30) at which the luminance I assumes the maximum value Imax. The aforementioned second color intensity memories Mr2, Mg2 and Mb2 compose a composite imaging information storage section and store the color imaging information received by the individual pixels in the color CCD 24 at the Z-coordinates stored in the Z-coordinate storage section Mz. In other words, the second color intensity memories Mr2, Mg2 and Mb2 store, for each pixel (imaging unit), the color imaging information obtained when the first optics 1 is brought into focus as a result of changes in the height of the sample stage 30 shown in FIG. 1.

The luminance transforming circuit 53 has a luminance comparing section 53c. The luminance comparing section 53c compares, for each imaging unit, the maximum luminance Imax stored in the maximum luminance storage section Mmax with the luminance I newly stored in the luminance memory Mi. If, as a result of this comparison, the luminance I newly stored in the luminance memory Mi for each imaging unit is found to be greater than the maximum luminance Imax, the luminance transforming circuit 53 has the maximum luminance storage sect ion Mmax store the luminance I as the maximum luminance.

The other components of the third embodiment are the same as those of the second embodiment shown in FIG. 5(a), and therefore need not be described or shown in detail.

We now describe the asperity-compatible color confocal image mode with reference to the flowchart in FIG. 7. The first step is step S11, in which the sample stage 30 (see FIG. 1) is moved to the uppermost end. In the next step S12, imaging is accomplished with the second optics 2 and electrical charge stored in the color CCD 24. Then, the process proceeds to step S13 and the first optics 1 performs imaging by scanning with the laser light L1 so as to acquire the luminance information. The contents of the information are stored in the maximum luminance storage section Mmax (see FIG. 6) for each of the imaging units (corresponding to the individual pixels in the CCD 24), whereas the Z-coordinates throughout the imaging are stored in the Z-coordinate storage section Mz. In addition, the transformed color intensity signals ro, go and bo obtained by luminance transformation are stored in the second color intensity memories Mr2, Mg2 and Mb2.

The process further proceeds to step S14, and the sample stage 30 (FIG. 1) is lowered one stage down. Thereafter, the process proceeds to step S15.

In step S15, the second optics 2 is activated again to acquire color imaging information and its contents are stored in the first color intensity memories Mr1, Mg1 and Mb1 (FIG. 6) for each pixel. The process then proceeds to step S16.

In step S16, the first optics 1 scans the laser light L1 while, in the manner to be described below, the maximum luminance Imax in the maximum luminance storage section Mmax is updated. Also, for the imaging units for which the maximum luminance Imax has been updated, the transformed color intensity signals ro, go and bo that have been stored in the second color intensity memories Mr2, Mg2 and Mb2 are updated. More specifically, the luminance I newly stored in the luminance memory Mi (FIG. 6) by scanning with the laser light L1 is compared, for each imaging unit, with the maximum luminance Imax in the maximum luminance storage section Mmax by the luminance comparing section 53c. If the comparison shows that I is greater than Imax for a certain imaging unit, the luminance transforming circuit 53 has the luminance I stored as a new maximum luminance Imax in the maximum luminance storage section Mmax. Additionally, the color imaging information, or the color intensity signals rm, gm and bm stored in the first color intensity memories Mr1, Mg1 and Mb1, are subjected to luminance transformation so that they are updated and stored as transformed color intensity signals ro, go and bo at the address of the particular imaging unit in each of the second color intensity memories Mr2, Mg2 and Mb2. If, on the other hand, the comparison shows that I is equal to or smaller than Imax, neither the maximum luminance Imax nor the transformed color intensity signals ro, go and bo are updated for the imaging unit of interest.

The process then proceeds to step S17 and a check is made to determine if the sample stage 30 is at the lowest position. If the answer is negative, the process returns to step S14. If the answer is affirmative, the process proceeds to step S18 and the transformed color intensity signals ro, go and bo are output to the D/A converter 60 (FIG. 5(a)) and a composite color picture signal c (FIG. 5(a)) is thereafter produced. Thus, steps S14–S17 are repeated so that the updating of the maximum luminance Imax in the maximum luminance storage section Mmax (FIG. 6) and the transformed color intensity signals ro, go and bo is repeated.

Therefore, the luminances of the transformed color intensity signals ro, go and bo that are output in step S18 can be expressed by the following equations (21)–(23), which are similar in nature to equations (11)–(13).

$$Ro = Kr \cdot Imax \cdot Rm/(Rm+Gm+Bm) \quad (21)$$

$$Go = Kg \cdot Imax \cdot Gm/(Rm+Gm+Bm) \quad (22)$$

$$Bo = Kb \cdot Imax \cdot Bm/(Rm+Gm+Bm) \quad (23)$$

If a command for "mode OFF" is entered in step S19, the current mode is brought to an end.

Thus, in the third embodiment, the color imaging information for the Z-coordinate that is obtained when the first optics 1 is brought to focus is used for each of the pixels in the color CCD 24 shown in FIG. 1. Even if the sample has any surface asperities, the necessary focusing is achieved for each pixel to produce an overall picture that is in a sharper focus than the ordinary magnified color image.

In the foregoing embodiments, luminance transformation is performed, but may be omitted in the present invention as follows.

Instead of performing luminance transformation in steps S13 and S16 in the flowchart shown in FIG. 7, the color imaging information stored in the first color intensity memories Mr1, Mg1 and Mb1 may be output to the second color intensity memories Mr2, Mg2 and Mb2 so that a composite color picture signal c is produced in accordance with the following equations (31)–(33).

$$Ro = Rm \quad (31)$$

$$Go = Gm \quad (32)$$

$$Bo = Bm \quad (33)$$

As in the third embodiment, the color imaging information for the Z-coordinate that is obtained when the first optics 1 is in focus is used for each of the pixels in the color CCD 24 (FIG. 1). The picture that can be produced is quite different from the ordinary magnified color image and strictly in focus.

Figure 8:
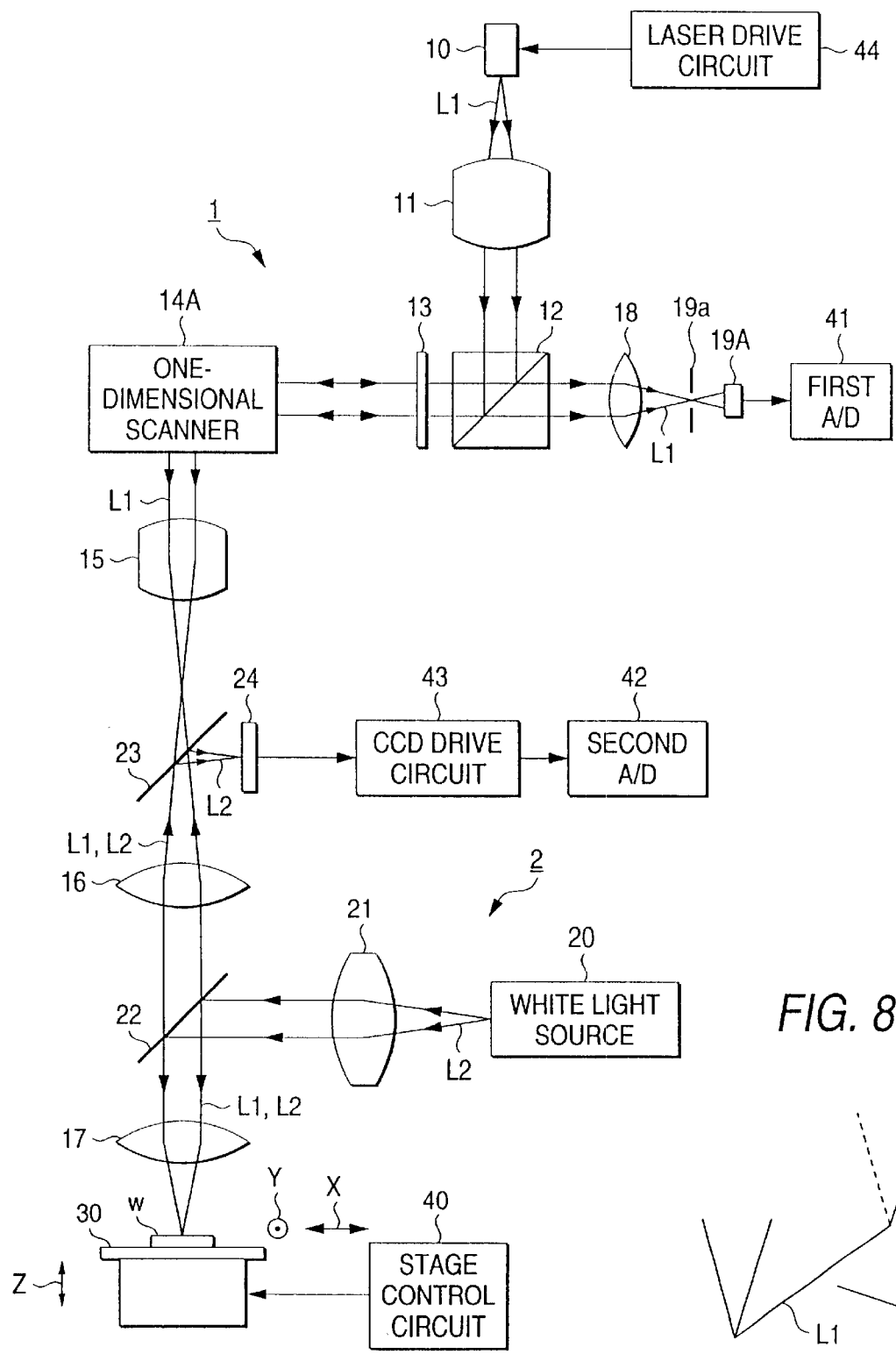
FIG. 8 (a) is a schematic diagram showing the general layout of a scanning microscope according to the fourth embodiment of the invention.
Figure 8:
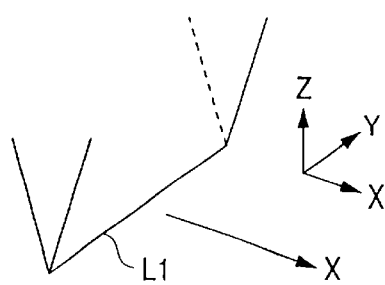

In the foregoing embodiments, the laser light L1 converges as a spot on the surface of the sample w and the first light-receiving element 19b. If desired, it may be replaced by a line of laser light L1 that converges linearly on the surface of the sample w and the first light-receiving element 19b. This alternative case is illustrated in FIG. 8(a) in which the laser light L1 is replaced by a line of laser light L1 which is elongated in the Y-direction. Additionally, the first light-receiving element 19b in dot form is replaced by a one-dimensional CCD 19A, which is elongated in the Y-direction, and the two-dimensional scanner 14 is replaced by a one-dimensional scanner 14A. In this case, as FIG. 8(b) shows, the line of laser light L1 is scanned in a direction perpendicular to the length of the line of its convergence on the surface of the sample w. The light stop 19a is shaped like a slit (groove).

Figure 9:
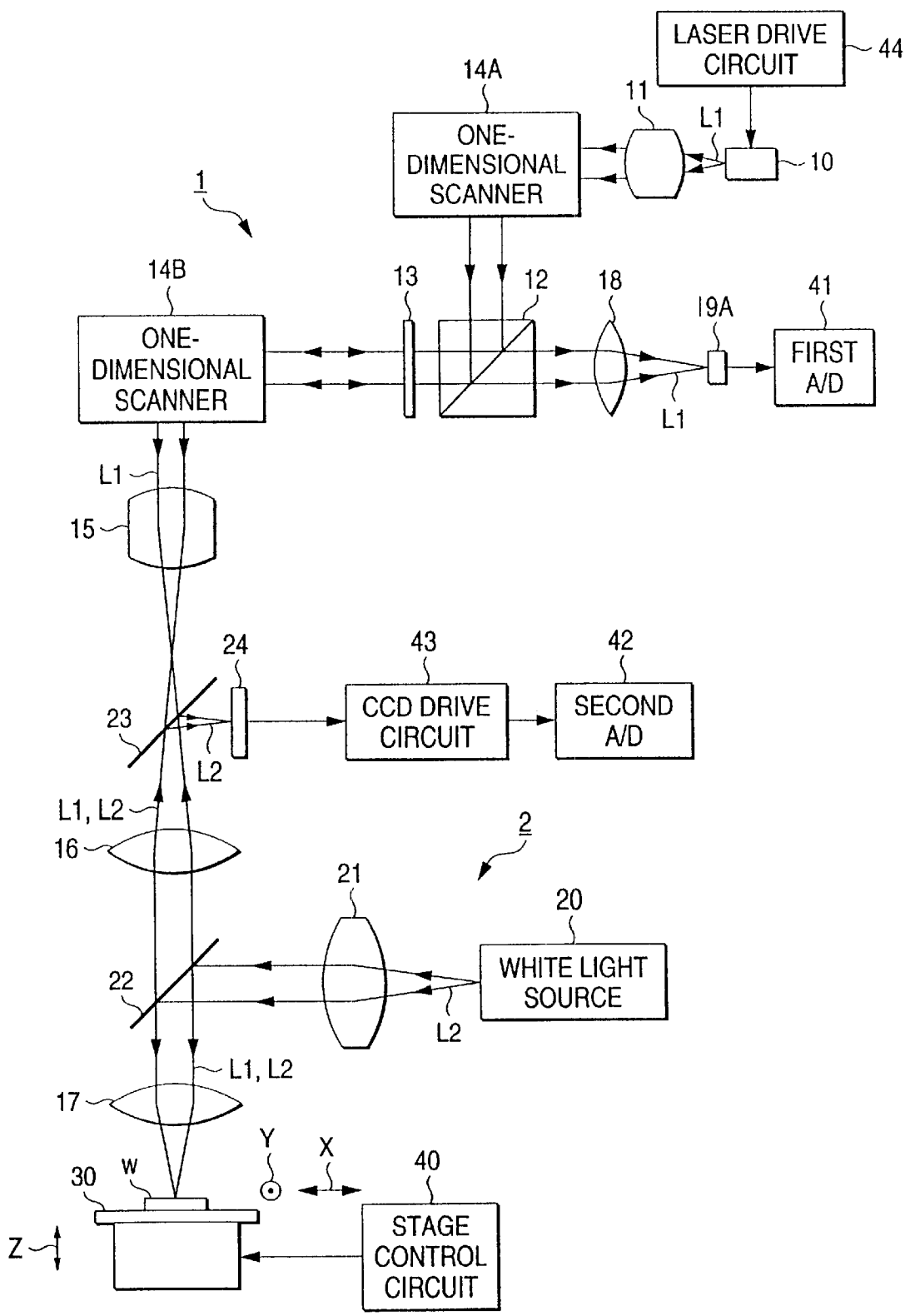
FIG 9 is a schematic diagram showing the general layout of a scanning microscope according to the fifth embodiment of the invention.

In the foregoing embodiments, the light stop 19a is provided in front of the first light-receiving element 19b in the laser optics 1 shown in FIG. 1, but this is an optional feature in the present invention and may be omitted. For example, as shown in FIG. 9, a black-and-white one-dimensional CCD 19A may be provided at the focal position of the second imaging lens 18. In this alternative case, the first one-dimensional scanner 14A is provided between the first collimator lens 11 and the polarizing beam splitter 12 whereas the second one-dimensional scanner 14B is provided between the one-quarter wavelength plate 13 and the first relay lens 15.

In the foregoing embodiments, the color CCD 24 is used as the second light-receiving element in the second optics 2 shown in FIG. 1, but other types of light-receiving elements may of course be employed. For example, a dichroic mirror may be used to separate the reflected light L2 into three primary light colors so that reflected light components of these primary colors are allowed to be incident upon three, black-and-white, two-dimensional CCDs. If different optics is permitted, there may be employed a one-dimensional scanner that uses a color line CCD as the second light-receiving element and which performs a one-dimensional scan with the white response light. Another device that may be used as the second light-receiving element is a set of three black-and-white line CCDs (for R, G and B) or a set of three point light-receiving elements (for R, G and B). In these alternative cases, the scanner of the white response light may also serve as the scanner of laser light L1.

Other examples of the second light-receiving element include MOS and other types of solid-state imaging devices, as well as a TV camera consisting of two or more imaging tubes.

In the embodiment shown in FIG. 1, the reflected components of the laser light L1 and the white light L2 are received by the first light-receiving element 19b and the color CCD 24, respectively. This is not the sole case of the invention, and it may be modified to receive the light transmitted through the sample w or the phosphor as a substitute for the aforementioned reflected light.

In the foregoing embodiments, colors are separated into the three primary colors of light. The present invention is in no way limited to this case only and colors may be separated into complementaries (yellow, cyan and green). If desired, color difference signals may be used as color information.

In the foregoing embodiments, the second relay lens 16 is provided for the laser optics 1 and the white light optics 2 to construct an infinite correction system. If desired, the second relay lens 16 may be omitted to construct a finite correction system.

As described on the foregoing pages, the scanning microscope of the invention obtains color information with the second optics using the color information providing illumination light differing from the laser light. Compared with the related color laser microscope using laser light of three primary colors, the optics of the present invention has a very simple structure, thereby reducing the cost and size of the scanning microscope.

The scanning microscope of the invention has a lower resolution of color information than the related color laser microscope. However, it acquires luminance information using the laser light, so the image it produces has a sufficiently higher resolution than ordinary magnified images that it is of a satisfactorily high value in practical use.

While only certain embodiments of the invention have been specifically described herein, it will be apparent that numerous modifications may be made thereto without departing from the spirit and scope of the invention.

What is claimed is:

1. A scanning microscope, comprising:

first optics for converging laser light on a sample using an objective lens, relatively scanning the laser light across a surface of the sample, and receiving a reflected component of the laser light, through the objective lens, using a first light-receiving element; and second optics for illumination light for color information that is different to from the laser light, onto the sample using the objective lens, and receiving a reflected component of the illumination light, through the objective lens, using a second light-receiving element;

wherein color picture signals are obtained from luminance information from the first light-receiving element and the color information from the second light-receiving element.

2. The scanning microscope according to claim 1, wherein the color picture signals contain both the luminance information from the first light-receiving element or corrected luminance information based on the luminance information and the color information from the second light-receiving element or corrected color information based on the color information.

3. The scanning microscope according to claim 1, wherein luminance information contained in the color information from the second light-receiving element is replaced by the luminance information from the first light-receiving element to produce color picture signals.

4. The scanning microscope according to claim 1, wherein luminance information contained in the color information from the second light-receiving element is replaced by corrected luminance information based on the luminance information from the first light-receiving element to produce color picture signals.

5. The scanning microscope according to claim 1, wherein luminance information and color information are produced using the first and second optics, respectively, as the distance from the objective lens to the sample is varied, and wherein the scanning microscope further comprises a maximum luminance storage section that stores a maximum luminance from the first light-receiving element for each of imaging units in the scan area and a composite imaging information storage section that stores for each of the imaging units the color imaging information from the second light-receiving element at a distance where the maximum luminance is obtained.

6. The scanning microscope according to claim 5, wherein the luminance information in the color imaging information stored in the composite imaging information storage section is replaced, for each of the imaging units, by the maximum luminance or corrected maximum luminance based on the maximum luminance so as to produce the color picture signals.

7. The scanning microscope according to claim 6, wherein the color imaging information stored in the composite imaging information storage section is used as the color picture signals.

8. The scanning microscope according to claim 1, wherein the laser light is prevented from being launched into the second light-receiving element when imaging is accomplished using the second light-receiving element.

9. A scanning microscope, comprising:

first optics for converging laser light on a sample using an objective lens, two-dimensionally scanning the laser light across a surface of the sample, and receiving a reflected component of the laser light, through the objective lens, using a first light-receiving element; and second optics for irradiating illumination light for color information that is different from the laser light, onto the sample using the objective lens, and receiving a reflected component of the illumination light, through the objective lens, using a second light-receiving element;

wherein color picture signals are obtained from luminance information from the first light-receiving element and the color information from the second light-receiving element.

10. The scanning microscope according to claim 9, wherein the color picture signals contain both the luminance information from the first light-receiving element or corrected luminance information based on the luminance information and the color information from the second light-receiving element or corrected color information based on the color information.

11. The scanning microscope according to claim 9, wherein luminance information contained in the color information from the second light-receiving element is replaced by the luminance information from the first light-receiving element to produce color picture signals.

12. The scanning microscope according to claim 9, wherein luminance information contained in the color information from the second light-receiving element is replaced by corrected luminance information based on the luminance information from the first light-receiving element to produce color picture signals.

13. The scanning microscope according to claim 9, wherein luminance information and color information are produced using the first and second optics, respectively, as the distance from the objective lens to the sample is varied, and wherein the scanning microscope further comprises a maximum luminance storage section that stores a maximum luminance from the first light-receiving element for each of imaging units in the scan area and a composite imaging information storage section that stores for each of the imaging units the color imaging information from the second light-receiving element at a distance where the maximum luminance is obtained.

14. The scanning microscope according to claim 13, wherein the luminance information in the color imaging information stored in the composite imaging information storage section is replaced, for each of the imaging units, by the maximum luminance or corrected maximum luminance based on the maximum luminance so as to produce the color picture signals.

15. The scanning microscope according to claim 14, wherein the color imaging information stored in the composite imaging information storage section is used as the color picture signals.

16. The scanning microscope according to claim 9, wherein the laser light is prevented from being launched into the second light-receiving element when imaging is accomplished using the second light-receiving element.

17. A scanning microscope, comprising:

first optics for converging a line of laser light linearly on a sample using an objective lens, relatively scanning the line of laser light across a surface of the sample, receiving a reflected component of the line of laser light, through the objective lens, using a first light-receiving element; and second optics for irradiating illumination light for color information that is different from the line of laser light, onto the sample using the objective lens and receiving a reflected component of the illumination light, through the objective lens, using a second light-receiving element;

where in color picture signals are obtained from luminance information from the first light-receiving element and the color information from the second light-receiving element.

18. The scanning microscope according to claim 17, wherein the color picture signals contain both the luminance information from the first light-receiving element or corrected luminance information based on the luminance information and the color information from the second light-receiving element or corrected color information based on the color information.

19. The scanning microscope according to claim 17, wherein luminance information contained in the color information from the second light-receiving element is replaced by the luminance information from the first light-receiving element to produce color picture signals.

20. The scanning microscope according to claim 17, wherein luminance information contained in the color information from the second light-receiving element is replaced by corrected luminance information based on the luminance information from the first light-receiving element to produce color picture signals.

21. The scanning microscope according to claim 17, wherein luminance information and color information are produced using the first and second optics, respectively, as the distance from the objective lens to the sample is varied, and wherein the scanning microscope further comprises a maximum luminance storage section that stores a maximum luminance from the first light-receiving element for each of imaging units in the scan area and a composite imaging information storage section that stores for each of the imaging units the color imaging information from the second light-receiving element at a distance where the maximum luminance is obtained.

22. The scanning microscope according to claim 21, wherein the luminance information in the color imaging information stored in the composite imaging information storage section is replaced, for each of the imaging units, by the maximum luminance or corrected maximum luminance based on the maximum luminance so as to produce the color picture signals.

23. The scanning microscope according to claim 22, wherein the color imaging information stored in the composite imaging information storage section is used as the color picture signals.

24. The scanning microscope according to claim 17, wherein the laser light is prevented from being launched into the second light-receiving element when imaging is accomplished using the second light-receiving element.

* * * * *